US007181910B2

(12) United States Patent
Nissen et al.

(10) Patent No.: US 7,181,910 B2
(45) Date of Patent: Feb. 27, 2007

(54) HYDRAULIC LIFTING DEVICE FOR BATTERY-OPERATED INDUSTRIAL TRUCKS

(75) Inventors: Nis-Georg Nissen, Brokstedt (DE); Thomas Stolten, Tremsbutte (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 11/075,511

(22) Filed: Mar. 9, 2005

(65) Prior Publication Data

US 2005/0198950 A1 Sep. 15, 2005

(30) Foreign Application Priority Data

Mar. 11, 2004 (DE) ...................... 10 2004 011 913

(51) Int. Cl.
*F16D 31/02* (2006.01)

(52) U.S. Cl. ........................................................ 60/414

(58) Field of Classification Search .................. 60/413, 60/452, 414

See application file for complete search history.

(56) References Cited

U.S. PATENT DOCUMENTS 5,493,861 A * 2/1996 Friedrichsen ................ 60/452

FOREIGN PATENT DOCUMENTS

| | | |
|---|---|---|
| DE | 44 02 653 | 1/1997 |
| DE | 44 23 644 | 1/1998 |
| DE | 299 11 686 | 10/1999 |
| DE | 100 10 670 | 11/2003 |
| GB | 2360757 | * 3/2001 |

* cited by examiner

*Primary Examiner*—F. Daniel Lopez
(74) *Attorney, Agent, or Firm*—Vidas, Arrett & Steinkraus, P.A.

(57) ABSTRACT

Hydraulic lifting device for battery-operated industrial trucks, with at least one hydraulic lifting cylinder, a hydraulic pump working as a pump in the load lifting operation mode, supplying the lifting cylinder with pressure medium and working as a motor in the operation mode of lowering the load, driven by the pressure medium that is displaced by the lifting cylinder, an electric machine coupled to the hydraulic pump, working as an electric motor in the load lifting mode and working as a generator in the mode of lowering the load, a rotation speed control device for the electric machine, the electric machine being controllable in its speed by the rotation speed control device, depending upon the actuation of a set-point transmitter, a lifting valve arrangement in a lifting branch leading to the lifting cylinder, a lowering branch between the lifting cylinder and a connection between a check valve and an entry of the hydraulic pump, a volume flow delimiter in the lowering branch, a bypass valve arrangement that connects an exit of the hydraulic pump with the tank, and at least one further hydraulic consumer, which can be supplied by the hydraulic pump via an assigned control valve, wherein the lifting valve in the lifting branch is disposed downstream from the branching of a conduit to the secondary consumer and the conduit is connectable to the tank via a pressure balance on the upstream side of the control valve.

3 Claims, 1 Drawing Sheet

HYDRAULIC LIFTING DEVICE FOR BATTERY-OPERATED INDUSTRIAL TRUCKS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

From DE 44 02 653 C2, a hydraulic lifting device has become known, in which at least one hydraulic lifting cylinder is actuated by a pump in the load lifting operation mode, the pump itself being driven by an electric machine. In the operation mode of lowering the load, the pump acts as a hydraulic motor and drives the electric machine as a generator (collectible load-lowering). In the lowering branch, a hydraulic volume flow delimiter is disposed, on which the overall hydraulic pressure drops at certain operating points and which takes on the load-keeping. The lowering branch is connected between a check valve and the entry of the hydraulic pump. At least one secondary consumer is provided, which can be supplied with the medium of the lifting cylinder in the load lowering operation of the lifting cylinder. The electric machine is always operated in the same sense of rotation, and the further hydraulic consumer can be supplied directly with hydraulic energy from the lowering action, so that losses of efficiency are minimised. A rotation speed control device provides for load-independent control of the lowering speed, both in the operation of the electric machine as a generator as well as upon control solely by means of a valve arrangement. The speed of lifting as well as that of lowering results from a rotation speed control of the electric engine. In doing so, it may occur that the lowering sped becomes undesirably high when the rotation speed of the electric machine is accordingly increased, because of the high volume flow requirement of the secondary consumer.

A similar lifting device as that one described has become known from DE 100 10 870 C2. A choker valve and a pressure balance are disposed in the lowering branch, and a connection point between choker valve and pressure balance is connected to the entrance of the hydraulic pump, whilst the exit of the pressure balance is conducted to the tank. With the described lifting device, even in the double supply service, i.e. energy recovery on the lowering act and supply of secondary consumers, a relatively good efficiency is achieved.

From DE 299 11 686 U, an electro-hydraulic lifting device has become known, in which on the one hand, the volume flows to the lifting cylinder and the tank, respectively, and to secondary consumers on the other hand, are subdivided in the pressure pipe, with the aid of a proportional three-way flow control device. In this connection, it is disadvantageous that the lifting valve is disposed after the flow control device, which may also act as a priority valve, in the tank conduit. Through this, flow losses are generated in the load lowering mode.

The invention is based on the objective to provide a hydraulic lifting device for battery-operated industrial trucks, through which minimal flow losses can be achieved independently from the particular volume flow requirements.

BRIEF SUMMARY OF THE INVENTION

In the invention, the lifting valve is disposed downstream from the branching of the conduit to the secondary consumer in the lifting branch. The conduit is connected to the tank via a pressure balance on the upstream side with respect to the control valve.

In the described hydraulic lifting device, the hydraulic fluid, which is displaced out of the lifting cylinder and which is flowing off into the tank via the lowering branch, the pump, the lifting branch and the tank conduit, flows exclusively through the pressure balance. This enables a high efficiency of energy recovery, compared to the known solutions.

As is per se known, two operating modes are possible for the energy recovery, namely, the generatoric one in which the electric machine is driven as a generator by the pump and supplies back current into the battery on the one hand, and on the other hand, the supply of one or more secondary consumers with the pressure medium which is disposable from the load lowering mode. Excessive pressure medium flows unused into the tank. As a result of the flow-favourably optimised construction of the device according to the invention, a hybrid form of both modes of operation is possible. When pressure and volume flow from the load lowering operation exceed the requirements for pressure and volume flow of one or more secondary consumers, the supply of one or more secondary consumers is possible, parallel to the generatoric recovery of the excess energy from the load lowering operation via pump and electric machine.

According to one embodiment of the invention, it is provided that the pressure balance is triggered by the pressure in the pressure pipe (in the lifting mode of operation) or the pressure at the secondary consumer, for the purpose of letting off the excessive, not required amount (load sensing). According to a further embodiment of the invention, it is provided that an entrance pressure balance is disposed on the upstream side of the secondary consumer. By reason of this design as a load-sensing system in connection with a two-way flow regulator (entrance pressure balance) for the triggering of the secondary consumer, there is the possibility to supply several secondary functions at the same time with pressure medium from the load lowering operation, and to regulate the function speed thereof independently of each other in dependence of the actuation of the particular set-point transmitter.

When the volume flow requirement of one or more secondary consumers is greater than the offer of volume flow which is disposable from the load lowering action, the rotation speed control device causes the rotation speed of the electric machine not to be increased for the rotation speed difference which theoretically results from this. Only as much flow is provided to the secondary consumers as is disposable from the load lowering operation mode. Through this, any undeliberate acceleration of the lowering action is avoided.

DETAILED DESCRIPTION OF THE INVENTION

Figure 1:
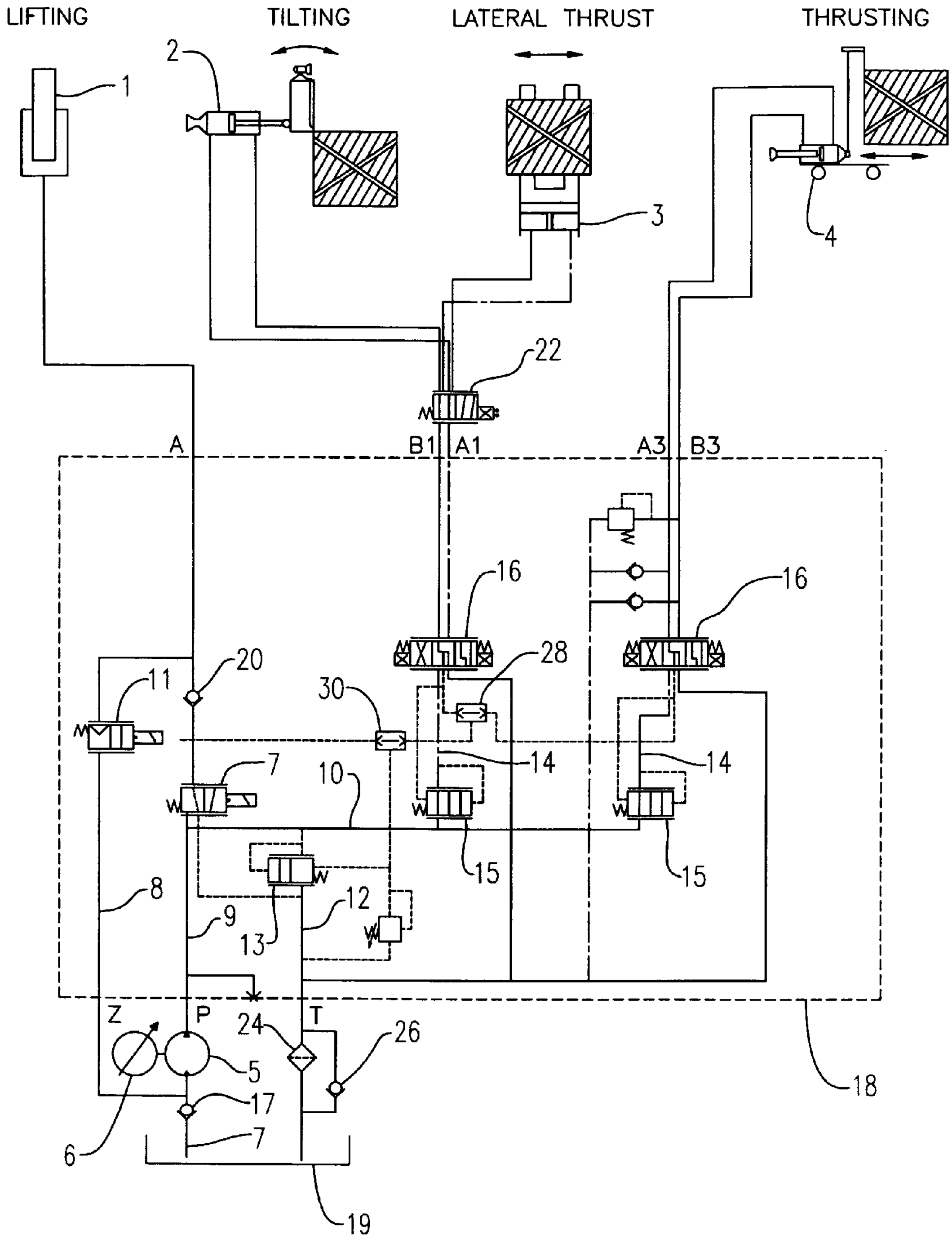
FIG. 1 schematic drawing of the invention.

While this invention may be embodied in many different forms, there are described in detail herein a specific preferred embodiment of the invention. This description is an exemplification of the principles of the invention and is not intended to limit the invention to the particular embodiment illustrated The drawing shows a hydraulic pump 5 can be recognised, which is coupled to an electric machine 6. The electric machine is controlled in its rotation speed by a rotation speed control device 50, the set-point being predetermined by a rotation speed set-point transmitter 52, which is actuated by an operator in the industrial truck. In the present case, reference ist is made to a reach mast truck which has a lifting cylinder 1, a tilting cylinder 2, a lateral thrusting cylinder 3 and a thrusting cylinder 4. With the tilting cylinder, the mast is tilted forward or backward, with the lateral thrusting cylinder the load lilting device is displaced laterally, and with the thrusting cylinder 4, the. mast is moved towards and off from the driving part, as is actually known.

The pump 5 provides the pressure medium for all the consumers (main consumer lifting cylinder 1 and secondary consumers 2 to 4), the pressure medium being sucked from a tank 19 via a check valve 17 in the tank conduit 7. The individual valves by which the different consumers are triggered, are housed in the block 18. A lifting valve 7 and a check valve 20 are disposed in a pressurising—or lifting conduit 9 to the lifting cylinder 1. The lifting speed is predetermined by the rotation speed of the electric motor 6, and the latter on its part is predetermined by the not shown pre-set point transmitter. A lowering branch 8, in which a choker valve 11 is disposed, is connected between lifting cylinder 1 and the check valve 20. The other end is connected to the tank conduit 7 between a check valve 17 and the pump 5. Any medium that flows back from the lifting cylinder is therefore always conducted via the pump 5. Between the lifting valve 7 and the pump, a branching conduit 10 is connected to the pressure pipe 9. It serves for the supply of the mentioned secondary consumers. For this purpose, two pressure balances 15 are connected to the conduit 10, the exit of which is connected to a conduit 14, each leading to a control valve 16. With the aid of the control valves 16, the speed of the secondary consumers is controlled. Tilting cylinder and lateral thrusting cylinder are concomitantly actuated via the control valve 16, namely via a further valve 22, the position of which determines to which of the cylinders 2, 3 the hydraulic medium will flow.

A tank conduit 12 is connected to the branching conduit 10, in which a pressure balance 13 is disposed. Via the pressure balance 13, the hydraulic medium reaches the tank 19, a filter 24 being disposed in the conduit 12 and parallel to this a check valve 26.

A first shuttle valve 28 is at any one time connected with the entrance of the control valves 16 on its end side. The position of the valve ball depends on which pressure at the two entrances is the bigger one. In the middle, the shuttle valve is connected to the entrance of a second shuttle valve 30, the other end of which is in connection with the pressure pipe 9. Even here, the position of the valve ball depends on which pressure is the bigger one at the two entrances of the shuttle valve. The middle of the second shuttle valve 30 is connected to a control entrance of the pressure balance 13. In this way, a load-sensing system is created.

The operation of the shown arrangement is as follows. In the lifting mode, the hydraulic unit acts as a pump, and the lifting speed is adjusted via a set-point transmitter according to the pre-setting by the operator. Through this, the opening aperture of the lifting valve is also predetermined. If any volume flow requirements of the secondary consumers occur during the lifting action, these are also supplied with hydraulic medium via the branching conduit 10, the amount being predetermined by the control valves 16, and the pressure balances 15 provide that this takes places in a fashion which is independent of the load.

During the lowering action, hydraulic medium reaches the pump 5 via the choker valve 11 and drives it, so that the electric machine 6 can work as a generator and can supply electric current back to the battery. The hydraulic medium reaches the tank 19 via the branch 10 and the pressure balance 13, which takes place in a fashion almost without losses. In doing so, the lifting valve 7 is naturally closed.

If volume flow requirements during the lowering action take place also with respect to the secondary consumers, these can be supplied, too. Again, hydraulic medium which is not required is conducted back via the pressure balance 13. When pressure—or volume flow of the load lowering action exceeds the pressure—and volume flow requirements of one or more secondary consumers, generatoric recovery of excess energy from the load lowering operation is possible in a parallel manner, via pump and electric machine 6, besides to supply of one or more secondary consumers. In the load lowering mode, secondary consumers can be provided with pressure medium independently from each other, in order to be controlled in dependence from the actuation of the control valves 16 and the corresponding pre-set point transmitters, respectively. When the volume flow requirement of one or more secondary consumers is greater than the offer of volume flow which is disposable from the load lowering action, the rotation speed control causes the rotation speed of the electric motor 6 not to increase about the rotation speed difference resulting therefrom theoretically. To the secondary consumers, only as much volume flow is provided as is disposable from the load lowering operation. Through this, any undeliberate acceleration of the lowering operation is avoided.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Hydraulic lifting device for battery-operated industrial trucks, with at least one hydraulic lifting cylinder, a hydraulic pump working as a pump in the load lifting operation mode, supplying the lifting cylinder with pressure medium and working as a motor in the operation mode of lowering the load, driven by the pressure medium that is displaced by the lifting cylinder, an electric machine coupled to the hydraulic pump, working as an electric motor in the load lifting mode and working as a generator in the mode of lowering the load, a rotation speed control device for the electric machine, the electric machine being controllable in its speed by the rotation speed control device, depending upon the actuation of a set-point transmitter, a lifting valve arrangement in a lifting branch leading to the lifting cylinder, a lowering branch between the lifting cylinder and a connection between a check valve and an entry of the hydraulic pump, whereby the medium from the lifting cylinder in the lowering mode flows completely through the pump, only a volume flow delimiter being connected to the lowering branch, at least one further hydraulic consumer, adapted to be supplied by the hydraulic pump via a control valve, the lifting valve in the lifting branch being disposed downstream from the branching of a conduit to the secondary consumer and the conduit is connectable to the tank via a pressure balance on the upstream side of the control valve, the pressure balance being controlled by the respective higher pressure of either the lifting cylinder or the secondary consumer in order to drain excessive volume flow not required by the secondary consumer, the rotation speed control device being such during the lowering mode the supply of the secondary consumer is solely by the volume flow from the lifting cylinder whereby an acceleration of the speed of the lifting cylinder is avoided.

2. Device according to claim 1, characterised in that an entrance pressure balance is disposed on the upstream side of the control valve.

3. Device according to claim 1, characterised in that the rotation speed control device for the electric machine is dimensioned such that the rotation speed, which is predetermined by the load lowering operation, is not increased when the volume flow requirement of the secondary consumer is greater than the volume flow provided by the load lowering operation.

* * * * *